US012623496B2

(12) United States Patent
Sarazin

(10) Patent No.: US 12,623,496 B2
(45) Date of Patent: May 12, 2026

(54) TIRE COMPRISING AN OPTIMIZED LAYER OF SELF-SEALING PRODUCT

(71) Applicant: COMPAGNIE GENERALE DES ETABLISSEMENTS MICHELIN, Clermont-Ferrand (FR)

(72) Inventor: Frederic Sarazin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/029,331

(22) PCT Filed: Sep. 24, 2021

(86) PCT No.: PCT/FR2021/051647
§ 371 (c)(1),
(2) Date: Mar. 29, 2023

(87) PCT Pub. No.: WO2022/069820
PCT Pub. Date: Apr. 7, 2022

(65) Prior Publication Data
US 2023/0311590 A1 Oct. 5, 2023

(30) Foreign Application Priority Data

Sep. 29, 2020 (FR) ...................................... 2009908

(51) Int. Cl.
B60C 11/04 (2006.01)
B29C 73/18 (2006.01)
(Continued)

(52) U.S. Cl.
CPC ............ B60C 19/122 (2013.01); B29C 73/18 (2013.01); B60C 11/042 (2013.01); B60C 2011/0339 (2013.01)

(58) Field of Classification Search
CPC ..... B60C 19/12; B60C 19/122; B60C 19/125; B60C 19/127; B60C 2011/0339; B60C 11/12
See application file for complete search history.

(56) References Cited

U.S. PATENT DOCUMENTS 4,113,799 A 9/1978 Van Ornum et al.
4,115,172 A 9/1978 Baboff et al.
(Continued)

FOREIGN PATENT DOCUMENTS

CN 105377587 A 3/2016
CN 107000341 A 8/2017
(Continued)

OTHER PUBLICATIONS

Machine translation of DE 102016212472, 2018.*
International Search Report dated Jan. 24, 2022, in corresponding PCT/FR2021/051647 (4 pages).

*Primary Examiner* — Justin R Fischer
(74) *Attorney, Agent, or Firm* — VENABLE LLP

(57) ABSTRACT

The tire comprises a tread (14) comprising a deeply cut rib (68, 70) and a slightly cut rib (62, 64, 66), and a layer of a self-sealing product (80) comprising: a portion (90", 92") extending in line with the deeply cut rib (68, 70) and having an average thickness $Ec>0$ of self-sealing product, and a portion (100', 102', 104') extending in line with the slightly cut rib (62, 64, 66) and having an average thickness $Eb \geq 0$ of self-sealing product such that $Eb<Ec$.

14 Claims, 4 Drawing Sheets

(51) Int. Cl.
  _B60C 11/13_ (2006.01)
  _B60C 19/12_ (2006.01)
  _B60C 11/03_ (2006.01)

(56) References Cited

U.S. PATENT DOCUMENTS

| | | | |
|---|---|---|---|
| 4,359,354 | A | 11/1982 | Bohm |
| 4,426,468 | A | 1/1984 | Ornum et al. |
| 4,745,954 | A | 5/1988 | Toyohara et al. |
| 4,913,209 | A | 4/1990 | Hong et al. |
| 5,085,942 | A | 2/1992 | Hong et al. |
| 5,295,525 | A | 3/1994 | Sanda, Jr. |
| 8,573,271 | B2 | 11/2013 | Lopez et al. |
| 8,957,132 | B2 | 2/2015 | Voge et al. |
| 9,243,133 | B2 | 1/2016 | Voge et al. |
| 9,415,639 | B2 | 8/2016 | Voge et al. |
| 9,677,025 | B2 | 6/2017 | Voge et al. |
| 10,195,907 | B2 | 2/2019 | Washizuka et al. |
| 10,399,391 | B2 | 9/2019 | Majumdar et al. |
| 10,730,255 | B2 | 8/2020 | Barjon et al. |
| 10,870,319 | B2 | 12/2020 | Frantzen et al. |
| 2010/0300593 | A1 | 12/2010 | Merino Lopez et al. |
| 2013/0202829 | A1 | 8/2013 | Voge et al. |
| 2013/0203913 | A1 | 8/2013 | Voge et al. |
| 2013/0263990 | A1 | 10/2013 | Voge et al. |
| 2016/0032215 | A1 | 2/2016 | Voge et al. |
| 2016/0159158 | A1 | 6/2016 | Washizuka et al. |
| 2016/0167455 | A1 | 6/2016 | Majumdar et al. |
| 2017/0080655 | A1 | 3/2017 | Barjon et al. |
| 2019/0359013 | A1 | 11/2019 | Frantzen et al. |
| 2020/0189215 | A1 | 6/2020 | Griffoin et al. |
| 2023/0001747 | A1 | 1/2023 | Nakajima |
| 2023/0364869 | A1 | 11/2023 | Sarazin |
| 2023/0405953 | A1 | 12/2023 | Sarazin |

FOREIGN PATENT DOCUMENTS

| | | | |
|---|---|---|---|
| DE | 102016212472 | * | 1/2018 |
| EP | 1090069 | B1 | 7/2004 |
| EP | 2167329 | B1 | 12/2012 |
| EP | 2629964 | A2 | 8/2013 |
| EP | 3266627 | A1 | 1/2018 |
| EP | 3572218 | A1 | 11/2019 |
| EP | 3666510 | A2 | 6/2020 |
| FR | 2955587 | A1 | 7/2011 |
| JP | 2016-221991 | A | 12/2016 |
| KR | 10-1497839 | B1 | 3/2015 |
| WO | 99/62998 | A1 | 12/1999 |
| WO | 2011/092122 | A1 | 8/2011 |
| WO | 2011/092123 | A1 | 8/2011 |
| WO | 2015/173120 | A1 | 11/2015 |
| WO | 2020/009849 | A1 | 1/2020 |

* cited by examiner

TIRE COMPRISING AN OPTIMIZED LAYER OF SELF-SEALING PRODUCT

BACKGROUND

The present invention relates to a tyre. A tyre is understood to mean a casing intended to form a cavity by cooperating with a support element, for example a rim, this cavity being able to be pressurized to a pressure higher than atmospheric pressure. A tyre according to the invention has a structure of substantially toroidal shape exhibiting symmetry of revolution about a main axis of the tyre.

EP2629964 discloses a tyre comprising a tread intended to come into contact with the ground, when the tyre is running, via a tread surface. The tread comprises main circumferential cuts and central ribs, each of which is arranged axially between two adjacent main circumferential cuts and which are axially delimited by the said two adjacent main circumferential cuts.

The tyre of EP2629964 comprises an airtight internal layer intended to form a cavity which is airtight with respect to the inflation gas when the tyre is mounted on a mounting support, for example a rim, and a layer of a self-sealing product extending circumferentially radially on the inside of part of the airtight internal layer.

In the event of perforation of the tyre owing to a perforating object, the layer of self-sealing product makes it possible to seal the orifice created by the perforating object under the effect of the internal pressure of the tyre. This is because, under the effect of the internal pressure of the tyre, the self-sealing product is made to flow into the orifice through which the air streams towards the outside, in order to seal it and re-establish airtightness with respect to the inflation gas. Numerous self-sealing products have been described in the prior art, notably in U.S. Pat. No. 4,426,468, EP1090069, WO99/62998, U.S. Pat. Nos. 4,113,799, 4,115, 172, 4,913,209, 5,085,942, 5,295,525, FR2955587 and EP2167329.

The presence of the layer of self-sealing product, although it has proven to be effective at combating perforations, necessarily causes the tyre to become heavier than a tyre that lacks a layer of self-sealing product.

An aim of the invention is to provide a tyre provided with a layer of sealing product, which is as lightweight as possible and of which the layer of self-sealing product is substantially as effective against perforations as the layers of self-sealing product of the tyres of the prior art.

SUMMARY

To this end, one subject of the invention is a tyre comprising:
a tread comprising:
at least one rib, referred to as deeply cut rib, comprising at least one transverse cut having a depth Ht such that Ht/Hs≥50%, where Hs is the tread pattern height,
at least one rib, referred to as non-cut or slightly cut rib, which lacks transverse cuts or comprises transverse cuts, each satisfying, for at least 50% of the number of transverse cuts of the or each non-cut or slightly cut rib, at least one of the following conditions:
the transverse cut of the non-cut or slightly cut rib has a width strictly less than 1.6 mm,
the transverse cut of the non-cut or slightly cut rib has a depth H such that H/Hs<50%,
an airtight internal layer, a layer of a self-sealing product extending circumferentially radially on the inside of part of the airtight internal layer,
over at least 50% of the circumferential length of the layer of self-sealing product, the layer of self-sealing product comprising:
an axial portion extending axially in line with the deeply cut rib and having an average thickness Ec>0 of self-sealing product,
an axial portion extending axially in line with the non-cut or slightly cut rib and having an average thickness Eb≥0 of self-sealing product such that Eb<Ec.

The inventors responsible for the invention have determined that the axial portions of the tread that run the greatest risk of being perforated are the ribs in which the deepest transverse cuts are formed. In accordance with the invention, these axial portions comprise the transverse cuts having a depth at least equal to half of the tread pattern height. Thus, the invention provides a relatively high average thickness Ec of self-sealing product in line with these deeply cut ribs, thereby making it possible to ensure high effectiveness of the layer of self-sealing product against the perforations that occur in these deeply cut ribs.

In order to reduce the weight of the tyre, the inventors have determined that the weakly or slightly cut ribs statistically run a lower risk of being perforated. This is because, in the case of a non-cut rib, a relatively great thickness of the tread resists perforation to a greater extent than a relatively small thickness does. In the case of a slightly cut rib comprising shallow transverse cuts, for the one part, the thickness of the tread protects the tyre from perforation if the perforating object is relatively short and, for the other part, a relatively great thickness of the tread resists perforation to a greater extent than a relatively small thickness does. In addition, in the case of a slightly cut rib comprising narrow transverse cuts, the probability of a perforating object becoming lodged therein is relatively low. Thus, the invention provides a relatively small, or even zero, average thickness Eb of self-sealing product in line with the non-cut or slightly cut ribs, thereby making it possible to significantly reduce the weight of the tyre.

In the event of perforation of the tyre owing to a perforating object, the layer of self-sealing product makes it possible to seal the orifice created by the perforating object under the effect of the internal pressure of the tyre. This is because, under the effect of the internal pressure of the tyre, the self-sealing product is made to flow into the orifice through which the air streams towards the outside, in order to seal it and re-establish airtightness with respect to the inflation gas.

Advantageously, in certain embodiments, the layer of self-sealing product is made up of a single self-sealing product. In these embodiments, the self-sealing product is arranged in contact with the inflation gas present in the cavity delimited at least partially by the self-sealing product and a mounting support of the tyre, for example a rim, when the tyre is mounted on the mounting support.

In accordance with the invention, in certain embodiments, it is possible to have one or more deeply cut rib(s) and one or more axial portion(s) with a relatively great non-zero thickness, each extending axially in line with the or one of the deeply cut ribs, and one or more non-cut or slightly cut rib(s) and multiple axial portion(s) with a relatively reduced non-zero thickness, each extending axially in line with the or one of the non-cut or slightly cut ribs.

In other embodiments, it is possible to have one or more deeply cut rib(s) and one or more axial portion(s) with a relatively great non-zero thickness, each extending axially in line with the or one of the deeply cut ribs, and one or more non-cut or slightly cut rib(s) and one or more axial portion(s) with a thickness of zero, each extending axially in line with the or one of the non-cut or slightly cut ribs.

In other embodiments, it is possible to have one or more deeply cut rib(s) and one or more axial portion(s) with a relatively great non-zero thickness, each extending axially in line with the or one of the deeply cut ribs, one or more non-cut or slightly cut rib(s) and one or more axial portion(s) with a relatively reduced non-zero thickness, each extending axially in line with the or one of the non-cut or slightly cut ribs, and one or more axial portion(s) with a thickness of zero, each extending axially in line with the or one of the non-cut or slightly cut ribs.

That axial portion of the layer of self-sealing product that is arranged in line with a deeply cut rib or with a non-cut or slightly cut rib of the tread is the axial portion of self-sealing product that is delimited by axial ends defined by two circumferential planes perpendicular to the axis of rotation of the tyre, each of which passes through the axial ends of the corresponding rib. Thus, if an axial portion, referred to as thick axial portion, of the layer of self-sealing product has an axial width greater than the axial width of the deeply cut rib, only part of the thick axial portion of the layer of self-sealing product is located in line with the deeply cut rib. If a thick axial portion of the layer of self-sealing product has an axial width less than the axial width of the deeply cut rib, the entirety of the thick axial portion of the layer of self-sealing product is located in line with the deeply cut rib. Similarly, if an axial portion, referred to as thin axial portion, of the layer of self-sealing product has an axial width greater than the axial width of the non-cut or slightly cut rib, only part of the thin axial portion of the layer of self-sealing product is located in line with the non-cut or slightly cut rib. If a thin axial portion of the layer of self-sealing product has an axial width less than the axial width of the non-cut or slightly cut rib, the entirety of the thin axial portion of the layer of self-sealing product is located in line with the non-cut or slightly cut rib.

The invention is advantageous, without this constituting an essential feature, in the embodiments in which the or each transverse cut of the or each deeply cut rib is particularly deep, that is to say for which $Ht/Hs \geq 75\%$ and more preferably $Ht/Hs \geq 90\%$.

Moreover, the invention is advantageous, without this constituting an essential feature, in the embodiments in which the or each transverse cut of the or each slightly cut rib is particularly narrow, that is to say for which its width is strictly less than 1.6 mm and more preferably strictly less than 1.0 mm.

The invention is likewise advantageous, without this constituting an essential feature, in the embodiments in which the or each transverse cut of the or each slightly cut rib is particularly shallow, that is to say for which $H/Hs \leq 30\%$.

The advantageous features of the transverse cuts described above relate to the transverse cuts of the or each slightly cut rib are satisfied for at least 50%, preferably for at least 75% and more preferably for 100% of the number of transverse cuts of the or each slightly cut rib.

Because the layer of self-sealing product exhibits the essential features of the invention over at least 50% of the circumferential length of the layer of self-sealing product, it becomes possible to envisage embodiments in which the tyre does not have a layer of self-sealing product over at most 50% of the circumferential length of the layer of self-sealing product, or embodiments in which the layer of self-sealing product extends over 100% of the circumferential length of the layer of self-sealing product without otherwise exhibiting the essential features over 100% of the circumferential length. Of course, in order to maximize the effects of the invention, the layer of self-sealing product exhibits the essential features of the invention over at least 75%, more preferably over at least 95% and ideally over 100% of the circumferential length of the layer of self-sealing product.

The invention makes it possible to envisage embodiments in which the layer of self-sealing product extends circumferentially in a discontinuous or continuous manner over all or part of the circumferential length of the layer of self-sealing product. With preference, and in order to ensure high effectiveness of the layer of self-sealing product against perforations, each axial portion of the layer of self-sealing product extending in line with the or each deeply cut rib and non-cut or slightly cut rib extends circumferentially in a continuous manner over at least 50%, preferably over at least 75%, more preferably over at least 95% and ideally over 100% of the circumferential length of the layer of self-sealing product.

The invention likewise makes it possible to envisage axial portions of the layer of self-sealing product that have variable thicknesses in the circumferential direction. However, in order to maximize the gain in mass and to ensure uniform effectiveness of the layer of self-sealing product in line with each deeply cut rib and non-cut or weakly cut rib, the average thickness of each axial portion of the layer of self-sealing product extending in line with the or each deeply cut rib and non-cut or slightly cut rib is circumferentially substantially constant over at least 50%, preferably over at least 75%, more preferably over at least 95% and ideally over 100% of the circumferential length of the layer of self-sealing product.

Each average thickness Eb, Ec of the axial portion of the layer of self-sealing product extending axially in line with each deeply cut rib and non-cut or slightly cut rib is measured by averaging the thicknesses, in multiple meridian section planes, of the layer of self-sealing product between the axial ends of the said axial portion of the layer of self-sealing product, the thicknesses being measured for example all in millimetres. In the preferred case in which the average thickness is substantially constant circumferentially, a reduced number of meridian section planes will be taken. If the average thickness is not constant circumferentially, a large number of meridian section planes, for example sixteen, will be taken, and the thicknesses measured in all the meridian section planes will be averaged. The thickness measured at a point is of course the shortest straight-line distance, between the radially external surface and the radially internal surface of the layer of self-sealing product, that passes through this point. It should be noted that the sections in the meridian section planes are taken without degrading the layer of self-sealing product in order to accurately measure the various geometric variables, notably the thicknesses. Notably, use will be made of very high-pressure water jet cutting processes.

On a new tyre, the depth of a cut is the maximum radial distance between the bottom of the cut and its projection onto the ground when the tyre is running. The maximum value for the depths of the cuts is referred to as the tread pattern height.

A cut denotes either a groove, or a sipe and forms a space opening onto the tread surface.

A sipe or a groove has, on the tread surface, two main characteristic dimensions: a width and a curvilinear length which are such that the curvilinear length is at least equal to two times the width. A sipe or a groove is therefore delimited by at least two main lateral faces determining its curvilinear length and connected by a bottom face, the two main lateral faces being distant from one another by a non-zero distance referred to as the width of the cut.

On a new tyre, the width of a cut is the maximum distance between the two main lateral faces measured, when the cut is not chamfered, at a radial side coincident with the tread surface and, when the cut is chamfered, at the radially outermost radial side of the cut and radially innermost side of the chamfer. The width is measured substantially perpendicularly to the main lateral faces.

The axial width of a cut, for its part, is measured in the axial direction of the tyre, for example in a meridian section plane of the tyre.

A sipe is such that the distance between the main lateral faces is suitable for enabling the main lateral faces that delimit the said sipe to come into at least partial contact in the contact patch, notably when the tyre is new and under normal running conditions, these notably including the fact that the tyre is under nominal load and at its nominal pressure.

A groove is such that the distance between the main lateral faces is such that these main lateral faces cannot come into contact with one another under normal running conditions, these notably including the fact that the tyre is under nominal load and at its nominal pressure.

A cut may be transverse or circumferential.

A transverse cut is such that the cut extends in a mean direction that makes an angle strictly greater than 30°, preferably greater than or equal to 45° with the circumferential direction of the tyre. The mean direction is the shortest curve that joins the two ends of the cut and is parallel to the tread surface. A transverse cut may be continuous, which is to say not interrupted by a tread pattern block or another cut, such that the two main lateral faces that determine its length are uninterrupted over the length of the transverse cut. A transverse cut may equally be discontinuous, which is to say interrupted by one or more tread pattern blocks and/or one or more other cuts, such that the two main lateral faces that determine its length are interrupted by one or more tread pattern blocks and/or one or more other cuts.

A circumferential cut is such that the cut extends in a mean direction that makes an angle less than or equal to 30°, preferably less than or equal to 10° with the circumferential direction of the tyre. The mean direction is the shortest curve that joins the two ends of the cut and is parallel to the tread surface. In the case of a circumferential cut that is continuous, the two ends coincide with one another and are joined by a curve that makes a full circuit of the tyre. A circumferential cut may be continuous, which is to say not interrupted by a tread pattern block or another cut, such that the two main lateral faces that determine its length are uninterrupted over a full circuit of the tyre. A circumferential cut may equally be discontinuous, which is to say interrupted by one or more tread pattern blocks and/or one or more other cuts, such that the two main lateral faces that determine its length are interrupted by one or more tread pattern blocks and/or one or more other cuts over a full circuit of the tyre.

In the case of a circumferential cut that is situated outside of the median plane of the tyre, the lateral faces are referred to as axially inner face and axially outer face, the axially inner face being arranged, at a given azimuth, axially on the inside of the axially inner face in relation to the median plane.

Each circumferential cut comprises axially inner and outer axial ends. Irrespective of whether a circumferential cut has a chamfer or not, each axially inner and outer axial end coincides with each axial edge of a circumferential cut located on the tread surface and therefore in contact with the ground on which the tyre is running.

In the case of a transverse cut, the lateral faces are referred to as leading face and trailing face, the leading face being the one of which the edge, for a given circumferential line, enters the contact patch before the edge of the trailing face.

In some embodiments, the or each circumferential cut, whether it is a main circumferential cut or not, is chamfered. A chamfer on a circumferential cut may be a straight chamfer or rounded chamfer. A straight chamfer is formed by a planar face that is inclined with respect to the axially inner and outer face that it continues as far as the axially inner or outer edge axially delimiting the circumferential cut. A rounded chamfer is formed by a curved face that merges tangentially into the axially inner or outer face that it continues. A chamfer on a circumferential cut is characterized by a height and a width which are respectively equal to the radial distance and to the axial distance between the point common to the axially inner or outer face continued by the chamfer and the axially inner or outer edge that axially delimit the circumferential cut.

In some embodiments, the or each transverse cut is chamfered. In other words, each transverse cut is radially delimited by leading and trailing faces that circumferentially delimit the said transverse cut and are connected to one another by a bottom face that delimits the said transverse cut radially inwards. A chamfer on a transverse cut may be a straight chamfer or rounded chamfer. A straight chamfer is formed by a planar face that is inclined with respect to the leading or trailing face that it continues as far as the leading or trailing edge circumferentially delimiting the transverse cut. A rounded chamfer is formed by a curved face that merges tangentially into the leading or trailing face that it continues. A chamfer on a transverse cut is characterized by a height and a width which are respectively equal to the radial distance and to the distance in a direction perpendicular to the leading or trailing faces between the point common to the leading or trailing face continued by the chamfer and the leading or trailing edge that circumferentially delimit the transverse cut.

In the conventional way, the axial ends of the tread are determined to be the axial ends of the tyre of the tread surface in contact with the ground on which the tyre is running on an unladen tyre mounted on a nominal rim and inflated to its nominal pressure, within the meaning of the European Tyre and Rim Technical Organisation, or "ETRTO", standard of 2019. In the event of an obvious boundary between the tread surface and the rest of the tyre, the axial ends of the tread are simply determined. If the tread surface is continuous with the external surfaces of the sidewalls of the tyre, each axial end of the tread passes through the point at which the angle between the tangent to the tread surface and a straight line parallel to the axial direction passing through this point is equal to 30°. When, in a meridian section plane, there are several points for which the said angle is equal, in terms of absolute value, to 30°, it is the radially outermost point that is adopted.

The tyre according to the invention has substantially the shape of a torus about an axis of revolution substantially coincident with the axis of rotation of the tyre. This axis of revolution defines three directions conventionally used by a person skilled in the art: an axial direction, a circumferential direction and a radial direction.

The expression "axial direction" means the direction substantially parallel to the axis of revolution of the tyre, that is to say the axis of rotation of the tyre.

The expression "circumferential direction" means the direction that is substantially perpendicular both to the axial direction and to a radius of the tyre (in other words, tangent to a circle centred on the axis of rotation of the tyre).

The expression "radial direction" means the direction along a radius of the tyre, that is to say any direction that intersects the axis of rotation of the tyre and is substantially perpendicular to that axis.

The expression "median plane of the tyre" (denoted M) is understood to mean the plane perpendicular to the axis of rotation of the tyre which is situated axially mid-way between the two beads and passes through the axial middle of the crown reinforcement.

The expression "equatorial circumferential plane of the tyre" (denoted E) is understood to mean, in a meridian section plane, the plane passing through the equator of the tyre, perpendicular to the median plane and to the radial direction. The equator of the tyre is, in a meridian section plane (plane perpendicular to the circumferential direction and parallel to the radial and axial directions), the axis that is parallel to the axis of rotation of the tyre and located equidistantly between the radially outermost point of the tread that is intended to be in contact with the ground and the radially innermost point of the tyre that is intended to be in contact with a support, for example a rim, the distance between these two points being equal to H.

The meridian plane is understood to be a plane parallel to and containing the axis of rotation of the tyre and perpendicular to the circumferential direction.

"Radially inside" and "radially outside" are understood to mean "closer to the axis of rotation of the tyre" and "further away from the axis of rotation of the tyre", respectively. "Axially inner" and "axially outer" are understood to mean "closer to the median plane of the tyre" and "further away from the median plane of the tyre", respectively.

A bead is understood to be the portion of the tyre intended to enable the tyre to be attached to a mounting support, for example a wheel comprising a rim. Thus, each bead is notably intended to be in contact with a flange of the rim enabling it to be attached.

Any range of values denoted by the expression "between a and b" represents the range of values extending from more than a to less than b (that is to say excluding the end-points a and b), whereas any range of values denoted by the expression "from a to b" means the range of values extending from a up to b (that is to say including the strict end-points a and b).

In preferred embodiments of the invention, the tyres are intended for passenger vehicles as defined according to the European Tyre and Rim Technical Organisation, or "ETRTO", standard of 2019. Such a tyre has a section in a meridian section plane that is characterized by a section height H and a nominal section width S, according to the European Tyre and Rim Technical Organisation, or "ETRTO", standard of 2019, that are such that the ratio H/S, expressed as a percentage, is at most equal to 90, preferably at most equal to 80 and more preferably at most equal to 70, and is at least equal to 30, preferably at least equal to 40, and the nominal section width S is at least equal to 115 mm, preferably at least equal to 155 mm and more preferably at least equal to 175 mm, and at most equal to 385 mm, preferably at most equal to 315 mm, more preferably at most equal to 285 mm and even more preferably at most equal to 255 mm. In addition, the diameter D at the rim flange, which defines the diameter of the mounting rim of the tyre, is at least equal to 12 inches, preferably at least equal to 16 inches, and at most equal to 24 inches, preferably at most equal to 20 inches.

Advantageously, each deeply cut rib and each non-cut or slightly cut rib is axially delimited by an axially inner end and by an axially outer end, each axially inner and outer end being chosen from:

an axial end of the tread, and an axially inner or outer end of a circumferential cut, referred to as main circumferential cut, having a depth Ha such that $Ha/Hs \geq 50\%$, preferably $Ha/Hs \geq 75\%$ and more preferably $Ha/Hs \geq 90\%$, the axially inner and outer ends of the rib being ends that are adjacent to one another.

In the case of a rib delimited axially by an axial end of the tread and an axially inner or outer end of a main circumferential cut, reference will generally be made to a lateral rib, since it is located in a lateral portion of the tread. In the case of a rib delimited axially by an axially inner (or outer) end of a main circumferential cut and by an adjacent axially outer (or inner) end of another main circumferential cut, reference will generally be made to a central rib, since it is located in a central portion of the tread.

The expression "adjacent ends" will be understood to mean that no axially inner or outer end of a main circumferential cut is arranged axially between the adjacent ends.

The or each circumferential cut is referred to as main circumferential cut owing to its depth Ha, which is greater than other, additional circumferential cuts which could optionally also be present on the tread of the tyre.

In some preferred embodiments, $Ec \geq 1.10 \times Eb$, preferably $Ec \geq 1.30 \times Eb$ and more preferably $Ec \geq 1.50 \times Eb$. For a given value of Ec, the higher the ratio Ec/Eb is, the smaller the average thickness Eb of the axial portion extending axially in line with the non-cut or slightly cut rib is and the greater the gain in mass is. For a given value of Eb, the higher the ratio Ec/Eb is, the larger the average thickness Ec of the axial portion extending axially in line with the deeply cut rib is, this promoting the effectiveness of the sealing of a possible orifice in the deeply cut rib.

In certain embodiments, $Ec \leq 5.00 \times Eb$, preferably $Ec \leq 4.00 \times Eb$ and more preferably $Ec \leq 2.50 \times Eb$. For a given value of Ec, the smaller the ratio Ec/Eb is, the larger the average thickness Eb of the axial portion extending axially in line with the non-cut or slightly cut rib is and the better the effectiveness of the sealing of a possible orifice in the non-cut or slightly cut rib is, which orifice, even though it is reduced in relative terms, exists all the same. For a given value of Eb, the smaller the ratio Ec/Eb is, the more the average thickness Ec of the axial portion extending axially in line with the deeply cut rib is reduced, this making it possible to reduce the mass of self-sealing product.

In embodiments that make it possible, as described above, to maximize the compromise between the gain in mass and the effectiveness of the sealing of a possible orifice in the deeply cut rib, $Ec-Eb \geq 0.5$ mm, preferably $Ec-Eb \geq 1.0$ mm.

In tyres for passenger vehicles and for utility vehicles that were described above, each average thickness Ec advantageously ranges from 2.0 mm to 5.0 mm, preferably from 2.5 mm to 4.5 mm, and the average thickness Eb advantageously ranges from 0.5 mm to 4.0 mm, preferably from 1.0 mm to 3.0 mm.

Advantageously, the layer of self-sealing product has, close to the deeply cut rib, an axial width which is significant in relation to the axial width of each deeply cut rib so as to be able to effectively seal a possible orifice. Thus, the layer of self-sealing product comprises at least one axial portion, referred to as thick axial portion, the or each thick axial portion at least partially coinciding with all or part of the or each axial portion extending axially in line with the or each deeply cut rib, the or each thick axial portion being axially delimited by two adjacent inflection points on the radially inner surface curve of the layer of self-sealing product, the thickness of the said thick axial portion increasing in the direction axially towards the inside of the said thick axial portion from each of the said inflection points, the axial width Wy of the thick axial portion being such that $Wy/Lcy \geq 0.50$, preferably $Wy/Lcy>1.00$, where Lcy is the axial width of the said deeply cut rib.

Thus, as defined above, the thick axial portion may have an axial width which is less than the axial width of the deeply cut rib, but which is still enough to make it possible to effectively seal a possible orifice. In this case, the thick axial portion coincides with a part of the axial portion of the layer of self-sealing product that extends in line with the deeply cut rib. Equally, the thick axial portion may preferably have an axial width that is greater than or equal to the axial width of the deeply cut rib. In this case, part of the thick axial portion coincides with the axial portion of the layer of self-sealing product that extends in line with the deeply cut rib.

An inflection point denotes a point at which, in a meridian section plane, the direction of the curvature of the radially inner surface curve of the layer of self-sealing product changes. It equally denotes a termination point of the radially inner surface curve of the layer of self-sealing product in contact with the airtight layer. The axial width of the or each thick axial portion is the distance in the axial direction, for example measured in a meridian section plane, between the two inflection points.

In embodiments in which the transverse cuts of the or each deeply cut rib are relatively wide, notably in the case of tyres for passenger vehicles and for utility vehicles, and run a high risk of being perforated, and therefore in which the invention is particularly advantageous, the or each transverse cut of the or each deeply cut rib has a width greater than or equal to 0.7 mm, preferably greater than or equal to 1.0 mm and more preferably greater than or equal to 1.6 mm.

In embodiments in which the transverse cuts of the or each deeply cut rib are relatively deep, notably in the case of tyres for passenger vehicles and for utility vehicles, and run a high risk of being perforated, and therefore in which the invention is particularly advantageous, the or each transverse cut of the or each deeply cut rib has a depth ranging from 2.0 mm to the tread pattern height, preferably ranging from 4.0 mm to the tread pattern height and more preferably ranging from 5.0 mm to the tread pattern height.

In order to maximize the effectiveness of the layer of self-sealing product over the vast majority of the axial width of the tread, each axial end of the layer of self-sealing product is arranged at an axial distance less than or equal to 20%, preferably less than or equal to 10% of the axial width of the tread in relation to respectively each axial end of the tread, preferably axially on the inside of each axial end of the tread.

In one embodiment, the tread comprises:
an axially central portion comprising:
two axially outermost main circumferential cuts arranged axially one on each side of the median plane of the tyre and having a depth Ha1, Ha2, respectively, such that $Ha1/Hs \geq 50\%$ and $Ha2/Hs \geq 50\%$, preferably $Ha1/Hs \geq 75\%$ and $Ha2/Hs \geq 75\%$ and more preferably $Ha1/Hs \geq 90\%$ and $Ha2/Hs \geq 90\%$,
the or each non-cut or slightly cut rib,
first and second axially lateral portions arranged axially on the outside of the axially central portion axially one on each side of the axially central portion in relation to the median plane of the tyre, each first and second axially lateral portion extending axially from each axial end of the tread to each axially outer end of each axially outermost main circumferential cut, at least one of the first and second axially lateral portions comprising a deeply cut rib.

Advantageously, each first and second axially lateral portion respectively comprises a first and a second deeply cut rib.

In an embodiment in which the tread comprises multiple deeply cut ribs, it is provided that the thickness of the layer of self-sealing product varies between a relatively great average thickness, when it is located in line with the deeply cut ribs, and a relatively reduced average thickness, when it is located in line with the non-cut or slightly cut ribs. Thus, the tread comprises:
P>1 deeply cut ribs respectively comprising at least one transverse cut having a depth Ht such that $Ht/Hs \geq 50\%$, preferably $Ht/Hs \geq 75\%$, more preferably $Ht/Hs \geq 90\%$, where Hs is the tread pattern height and P is the total number of deeply cut ribs present on the tyre,
$Q \geq 1$ non-cut or slightly cut rib(s) which lack(s) transverse cuts or comprise(s) transverse cuts, each satisfying, for at least 50%, preferably for at least 75% and more preferably for 100% of the number of transverse cuts of the or each slightly cut rib, at least one of the following conditions:
the transverse cut of the non-cut or slightly cut rib has a width strictly less than 1.6 mm, preferably strictly less than 1.0 mm and more preferably strictly less than 0.7 mm,
the transverse cut of the non-cut or slightly cut rib has a depth H such that $H/Hs<50\%$, preferably $H/Hs \leq 30\%$,
Q being the total number of non-cut or slightly cut rib(s) present on the tyre,
the layer of self-sealing product comprising:
P>1 axial portions each extending axially in line with one of the N deeply cut ribs and each having an average thickness Eck>0 of self-sealing product,
$Q \geq 1$ axial portion(s) each extending axially in line with the or one of the Q non-cut or slightly cut rib(s) and each having an average thickness $Ebj \geq 0$ of self-sealing product, with j ranging from 1 to Q, and being arranged axially between two adjacent axial portions of the layer of self-sealing product extending axially in line with two of the P deeply cut ribs, and such that, for each value of k ranging from 1 to P, at least 50% of the values of j ranging from 1 to Q, preferably at least 75% of the values of j ranging from 1 to Q and more preferably 100% of the values of j ranging from 1 to Q are such that Ebj<Eck.

In this embodiment, in one variant, Ec1=Ec2= . . . . EcP and Eb1=Eb2= . . . . EbQ, and thus the relationship Ebj<Eck is satisfied for each value of k ranging from 1 to P and for 100% of the values of j ranging from 1 to Q. In other variants, certain values of Eck could be different from the others depending on the compromise between effectiveness and gain in mass desired for the layer of self-sealing product, and the relationship Ebj<Eck could be satisfied for each value of k and for at least 50% of the values of j, preferably for 100% of the values of j when it is desired to maximize the gain in mass. Similarly, and for the same reason, certain values of Ebj could be different from the others.

In certain embodiments that make it possible, as indicated above, to promote the gain in mass and the effectiveness of the sealing of a possible orifice in each deeply cut rib, for each value of k ranging from 1 to P, at least 50% of the values of j ranging from 1 to Q, preferably at least 75% of the values of j ranging from 1 to Q and more preferably 100% of the values of j ranging from 1 to Q are such that Eck≥1.10×Ebj, preferably Eck≥1.30×Ebj and more preferably Eck≥1.50×Ebj.

In other embodiments that make it possible, as indicated above, to promote the gain in mass and the effectiveness of the sealing of a possible orifice in the or each non-cut or slightly cut rib, for each value of k ranging from 1 to P, at least 50% of the values of j ranging from 1 to Q, preferably at least 75% of the values of j ranging from 1 to Q and more preferably 100% of the values of j ranging from 1 to Q are such that Eck≤5.00×Ebj, preferably Eck≤4.00×Ebj and more preferably Eck≤2.50×Ebj.

In embodiments that make it possible, as described above, to maximize the compromise between the gain in mass and the effectiveness of the sealing of a possible orifice in each deeply cut rib, for each value of k ranging from 1 to P, at least 50% of the values of j ranging from 1 to Q, preferably at least 75% of the values of j ranging from 1 to Q and more preferably 100% of the values of j ranging from 1 to Q are such that Eck−Ebj≥0.5 mm, preferably Eck−Ebj≥1.0 mm.

As already indicated above, in tyres for passenger vehicles and for utility vehicles that were described above, each average thickness Eck advantageously ranges from 2.0 mm to 5.0 mm, preferably from 2.5 mm to 4.5 mm, and each average thickness Ebj advantageously ranges from 0.5 mm to 4.0 mm, preferably from 1.0 mm to 3.0 mm.

In most tyres for passenger vehicles and for utility vehicles, P=2 and Q=1, 2 or 3.

In certain embodiments, the tread comprises N=Q+1>1 main circumferential cuts respectively having a depth Hai such that Hai/Hs≥50%, preferably Hai/Hs≥75% and more preferably Hai/Hs≥90% for i ranging from 1 to N, N being the total number of main circumferential cuts present on the tyre, the or each non-cut or slightly cut rib being arranged axially between two adjacent main circumferential cuts and being delimited axially by the said two adjacent main circumferential cuts, the layer of self-sealing product comprising N>1 axial portions each extending axially in line with one of the N main circumferential cuts and each having an average thickness Eai>0 of self-sealing product, such that, for each value of i ranging from 1 to N, at least 50% of the values of j ranging from 1 to Q, preferably at least 75% of the values of j ranging from 1 to Q and more preferably 100% of the values of j ranging from 1 to Q are such that Ebj<Eai.

In these embodiments, apart from the one or more deeply cut ribs and the one or more non-cut or slightly cut ribs, the tyre comprises other axial portions, in this instance the main circumferential cuts, that run the risk of becoming perforated owing to their relatively great depth. In order to ensure effectiveness against perforation in these main circumferential cuts, the preceding embodiments provide the presence of an axial portion of the layer of self-sealing product in line with these main circumferential cuts.

"Adjacent main circumferential cuts" will be understood as meaning that no main circumferential cut is arranged axially between the adjacent main circumferential cuts. Similarly, "adjacent axial portions extending axially in line with two of the N main circumferential cuts" will be understood as meaning that no axial portion extending axially in line with one of the N main circumferential cuts is arranged axially between the adjacent axial portions.

Similarly to the definition of what an axial portion of the layer of self-sealing product in line with a rib is, that axial portion of the layer of self-sealing product that is arranged in line with a main circumferential cut is the axial portion of self-sealing product that is delimited by axial ends defined by two circumferential planes perpendicular to the axis of rotation of the tyre, each of which passes through the axial ends of the main circumferential cut. Thus, if an axial portion, referred to as thick axial portion, of the layer of self-sealing product has an axial width greater than the axial width of the main circumferential cut, only part of the thick axial portion of the layer of self-sealing product is located in line with the main circumferential cut. If a thick axial portion of the layer of self-sealing product has an axial width less than the axial width of the main circumferential cut, the entirety of the thick axial portion of the layer of self-sealing product is located in line with the main circumferential cut.

In these embodiments, in one variant, Ea1=Ea2= . . . . EaN and Eb1=Eb2= . . . . EbQ, and thus the relationship Ebj<Eai is satisfied for each value of i ranging from 1 to N and for 100% of the values of j ranging from 1 to Q. In other variants, certain values of Eai could be different from the others depending on the compromise between effectiveness and gain in mass desired for the layer of self-sealing product, and the relationship Ebj<Eai could be satisfied for each value of i and for at least 50% of the values of j, preferably for 100% of the values of j when it is desired to maximize the gain in mass. Similarly, and for the same reason, certain values of Ebj could be different from the others.

In certain embodiments that make it possible, as indicated above, to promote the gain in mass and the effectiveness of the sealing of a possible orifice in the main circumferential cut, for each value of i ranging from 1 to N, at least 50% of the values of j ranging from 1 to Q, preferably at least 75% of the values of j ranging from 1 to Q and more preferably 100% of the values of j ranging from 1 to Q are such that Eai≥1.10×Ebj, preferably Eai≥1.30×Ebj and more preferably Eai≥1.50×Ebj.

In other embodiments that make it possible, as indicated above, to promote the gain in mass and the effectiveness of the sealing of a possible orifice in the non-cut or slightly cut rib, for each value of i ranging from 1 to N, at least 50% of the values of j ranging from 1 to Q, preferably at least 75% of the values of j ranging from 1 to Q and more preferably 100% of the values of j ranging from 1 to Q are such that Eai≤5.00×Ebj, preferably Eai≤4.00×Ebj and more preferably Eai≤2.50×Ebj.

In embodiments that make it possible, as described above, to maximize the compromise between the gain in mass and the effectiveness of the sealing of a possible orifice in each main circumferential cut, for each value of i ranging from 1 to N, at least 50% of the values of j ranging from 1 to Q, preferably at least 75% of the values of j ranging from 1 to Q and more preferably 100% of the values of j ranging from 1 to Q are such that Eai−Ebj≥0.5 mm, preferably Eai−Ebj≥1.0 mm.

As already indicated above, in tyres for passenger vehicles and for utility vehicles that were described above, each average thickness Eai advantageously ranges from 2.0 mm to 5.0 mm, preferably from 2.5 mm to 4.5 mm, and each average thickness Ebj advantageously ranges from 0.5 mm to 4.0 mm, preferably from 1.0 mm to 3.0 mm.

In most tyres for passenger vehicles and for utility vehicles, N=2, 3 or 4.

In embodiments in which the main circumferential cuts are relatively wide main circumferential grooves, notably in the case of tyres for passenger vehicles and for utility vehicles, and run a very high risk of becoming perforated, the or each main circumferential cut has an axial width greater than or equal to 1.0 mm, preferably greater than or equal to 5.0 mm and more preferably greater than or equal to 8.0 mm, and, more preferably still, ranging from 8.0 mm to 20.0 mm.

In embodiments in which the main circumferential cuts are relatively deep, notably in the case of tyres for passenger vehicles and for utility vehicles, and run a very high risk of being perforated, the or each main circumferential cut has a depth ranging from 4.0 mm to the tread pattern height, preferably ranging from 5.0 mm to the tread pattern height and more preferably ranging from 5.5 mm to the tread pattern height.

Advantageously, the layer of self-sealing product has, close to the main circumferential cut, an axial width which is significant in relation to the axial width of the main circumferential cut so as to be able to effectively seal a possible orifice. Thus, the layer of self-sealing product comprises at least one axial portion, referred to as thick axial portion, the or each thick axial portion at least partially coinciding with all or part of the or each axial portion extending axially in line with the or each main circumferential cut, the or each thick axial portion being axially delimited by two adjacent inflection points on the radially inner surface curve of the layer of self-sealing product, the thickness of the said thick axial portion increasing in the direction axially towards the inside of the said thick axial portion from each of the said inflection points, the axial width Wx of the thick axial portion being such that $Wx/Lcx \geq 0.50$, preferably $Wx/Lcx > 1.00$, where Lox is the axial width of the main circumferential cut.

Thus, as defined above, the thick axial portion may have an axial width which is less than the axial width of the main circumferential cut, but which is still enough to make it possible to effectively seal a possible orifice. In this case, the thick axial portion coincides with a part of the axial portion of the layer of self-sealing product that extends in line with the main circumferential cut. Equally, the thick axial portion may preferably have an axial width that is greater than or equal to the axial width of the main circumferential cut. In this case, part of the thick axial portion coincides with the axial portion of the layer of self-sealing product that extends in line with the main circumferential cut.

Advantageously, $Wx/Lcx \leq 4.00$, preferably $Wx/Lcx \leq 3.00$, more preferably $Wx/Lcx \leq 2.00$, more preferably still $Wx/Lcx \leq 1.50$ and very preferably $Wx/Lcx \leq 1.25$. In order not to excessively increase the weight of the tyre, it is preferable not to provide a thick axial portion which is axially excessively wide, unless that has proven to be preferable for optimizing the anti-puncture performance, notably at the shoulders of the tyre. Thus, it would be possible for the thick axial portions corresponding to the axially outermost main circumferential cuts not to satisfy the above conditions, whereas the other thick axial portions corresponding to the other main circumferential cuts could satisfy them.

In the conventional way, the tyre comprises a crown, two sidewalls, and two beads, each sidewall connecting each bead to the crown. Again in the conventional way, the crown comprises the tread and a crown reinforcement arranged radially on the inside of the tread. The tyre also comprises a carcass reinforcement that is anchored in each bead and extends radially in each sidewall and axially in the crown, radially on the inside of the crown reinforcement.

In the conventional way, the crown reinforcement comprises at least one crown layer containing reinforcing elements. These reinforcing elements are preferably textile or metallic filamentary elements.

In embodiments that make it possible to obtain performance aspects of tyres known as radial tyres as defined by the ETRTO, the carcass reinforcement comprises at least one carcass layer, the or each carcass layer comprising carcass filamentary reinforcing elements, each carcass filamentary reinforcing element extending substantially along a main direction that forms an angle, in terms of absolute value ranging from 80° to 90°, with the circumferential direction of the tyre.

BRIEF DESCRIPTION OF THE FIGURES

The invention will be understood better on reading the following description, which is given purely by way of non-limiting example and with reference to the drawings, in which.

DETAILED DESCRIPTION

A frame of reference X, Y, Z corresponding to the usual axial (Y), radial (Z) and circumferential (X) directions, respectively, of a tyre is shown in the figures relating to the tyre.

In the following description, the measurements taken are taken on an unladen and non-inflated tyre or on a section of a tyre in a meridian plane.

Figure 1:
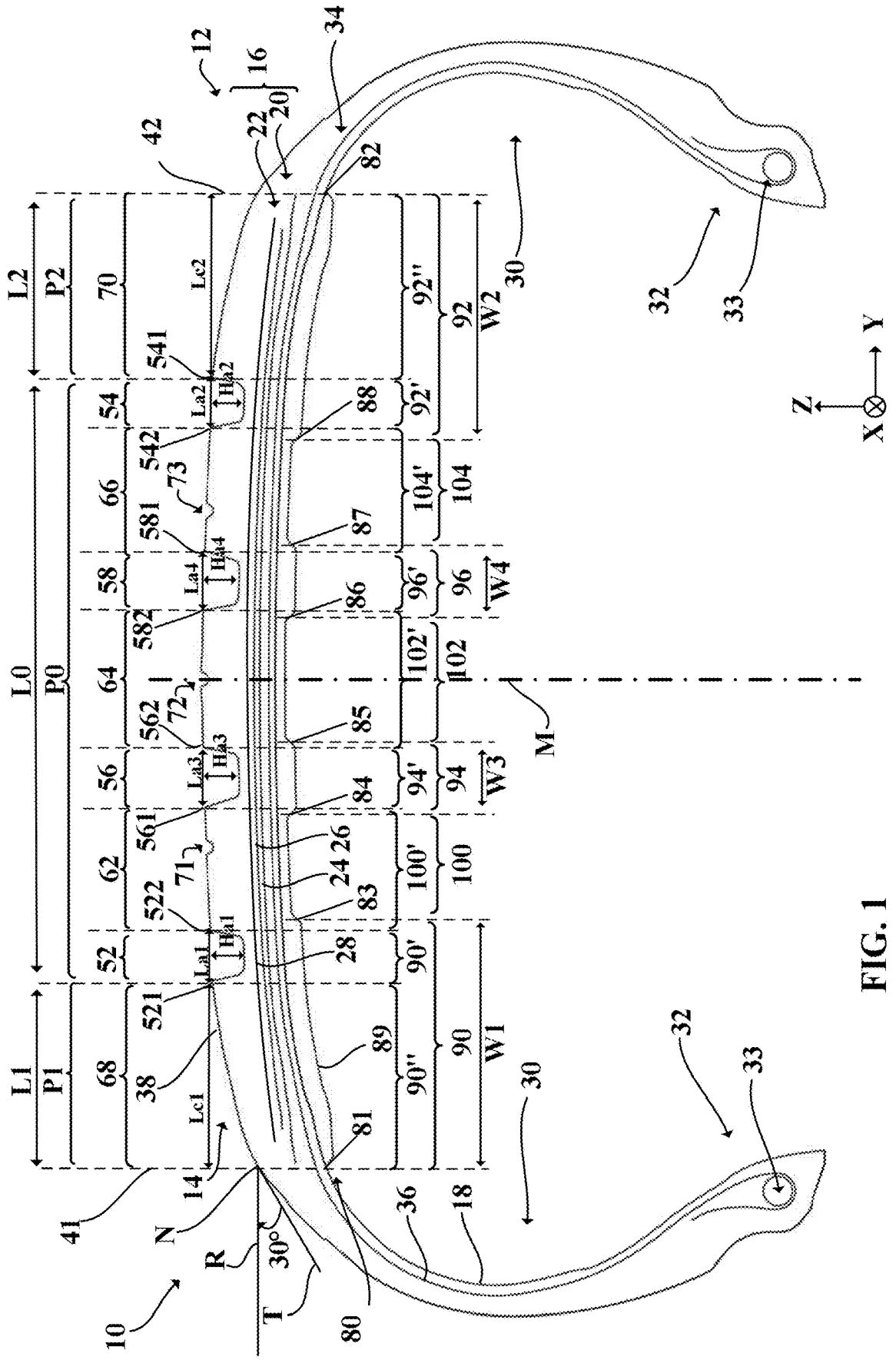
FIG. 1 is a view, in a meridian section plane parallel to the axis of rotation of the tyre, of a tyre according to a first embodiment of the invention.

FIG. 1 shows a tyre according to the invention and denoted by the general reference 10. The tyre 10 has a substantially toric shape about an axis of revolution substantially parallel to the axial direction Y. The tyre 10 is intended for a passenger vehicle and has the size 245/45 R18. In the various figures, the tyre 10 is depicted as new, which is to say when it has not yet been run.

The tyre 10 comprises a crown 12 comprising a tread 14 intended to come into contact with the ground when it is running and a crown reinforcement 16 extending in the crown 12 in the circumferential direction X. The tyre 10 also comprises a layer 18 that is airtight with respect to an inflation gas and is intended to delimit an internal cavity closed with a mounting support for the tyre 10 once the tyre 10 has been mounted on the mounting support, for example a rim.

The crown reinforcement 16 comprises a working reinforcement 20 and a hoop reinforcement 22. The working reinforcement 16 comprises at least one working layer and in this case comprises two working layers comprising a radially inner working layer 24 arranged radially on the inside of a radially outer working layer 26.

The hoop reinforcement 22 comprises at least one hooping layer and in this case comprises one hooping layer 28.

The crown reinforcement 16 is surmounted radially by the tread 14. In this case, the hoop reinforcement 22, in this case the hooping layer 28, is arranged radially on the outside of the working reinforcement 20 and is therefore interposed radially between the working reinforcement 20 and the tread 14.

The tyre 10 comprises two sidewalls 30 that extend the crown 12 radially inwards. The tyre 10 also has two beads 32 radially on the inside of the sidewalls 30. Each sidewall 30 connects each bead 32 to the crown 12.

The tyre 10 comprises a carcass reinforcement 34 that is anchored in each bead 32 and, in this instance, is wrapped around a bead wire 33. The carcass reinforcement 34 extends radially in each sidewall 30 and axially in the crown 12, radially on the inside of the crown reinforcement 16. The crown reinforcement 16 is arranged radially between tread 14 and the carcass reinforcement 34. The carcass reinforcement 34 comprises at least one carcass layer 36.

Each working layer 24, 26, hooping layer 28 and carcass layer 36 comprises an elastomer matrix in which one or more filamentary reinforcing elements of the corresponding layer are embedded.

The hoop reinforcement 22, in this case the hooping layer 28, comprises one or more hooping filamentary reinforcing elements that are wrapped circumferentially helically in a main direction and form an angle AF which, in terms of absolute value, is less than or equal to 10°, preferably less than or equal to 7° and more preferably less than or equal to 5° with the circumferential direction X of the tyre 10. In this case, AF=−5°.

Each radially inner working layer 24 and radially outer working layer 26 comprises working filamentary reinforcing elements extending in main directions and forming oppositely oriented angles AT1 and AT2, respectively, which, in terms of absolute value, are strictly greater than 10°, preferably ranging from 15° to 50° and more preferably ranging from 15° to 30° with the circumferential direction X of the tyre 10. In this case, AT1=−26° and AT2=+26°.

The carcass layer 36 comprises carcass filamentary reinforcing elements extending in a main direction D3 forming an angle AC which, in terms of absolute value, is greater than or equal to 60°, preferably ranging from 80° to 90° and in this case AC=+90°, with the circumferential direction X of the tyre 10.

Each hooping filamentary reinforcing element conventionally comprises two multifilament plies, each multifilament ply being made up of a spun yarn of aliphatic polyamide, in this instance nylon, monofilaments, with a thread count equal to 140 tex, these two multifilament plies being twisted in a helix individually at 250 turns per metre in one direction and then twisted together in a helix at 250 turns per metre in the opposite direction. These two multifilament plies are wound in a helix around one another. As a variant, use could be made of a hooping filamentary reinforcing element comprising one multifilament ply made up of a spun yarn of aliphatic polyamide, in this case nylon, monofilaments with a thread count equal to 140 tex, and one multifilament ply made up of a spun yarn of aromatic polyamide, in this case aramid, monofilaments with a thread count equal to 167 tex, these two multifilament plies being twisted in a helix individually at 290 turns per metre in one direction and then twisted together in a helix at 290 turns per metre in the opposite direction. These two multifilament plies are wound in a helix around one another. This variant will give AT1=−29° and AT2=+29°.

Each working filamentary reinforcing element is an assembly of two steel monofilaments wound in a helix at a pitch of 14 mm, each steel monofilament having a diameter equal to 0.30 mm. As a variant, use could also be made of an assembly of six steel monofilaments having a diameter equal to 0.23 mm and comprising an inner layer of two monofilaments wound together in a helix at a pitch of 12.5 mm in a first direction, for example the Z direction, and an outer layer of four monofilaments wound together in a helix around the inner layer at a pitch of 12.5 mm in a second direction opposite to the first direction, for example the S direction. In another variant, each working filamentary reinforcing element is made up of one steel monofilament having a diameter equal to 0.30 mm. More generally, the steel monofilaments have diameters ranging from 0.25 mm to 0.32 mm.

Each carcass filamentary reinforcing element conventionally comprises two multifilament plies, each multifilament ply being made up of a spun yarn of polyester, in this case PET, monofilaments, these two multifilament plies being twisted in a helix individually at 240 turns per metre in one direction and then twisted together in a helix at 240 turns per metre in the opposite direction. Each of these multifilament plies has a thread count equal to 220 tex. In other variants, use could be made of thread counts equal to 144 tex and twists equal to 420 turns per metre or thread counts equal to 334 tex and twists equal to 270 turns per metre.

Figure 2:
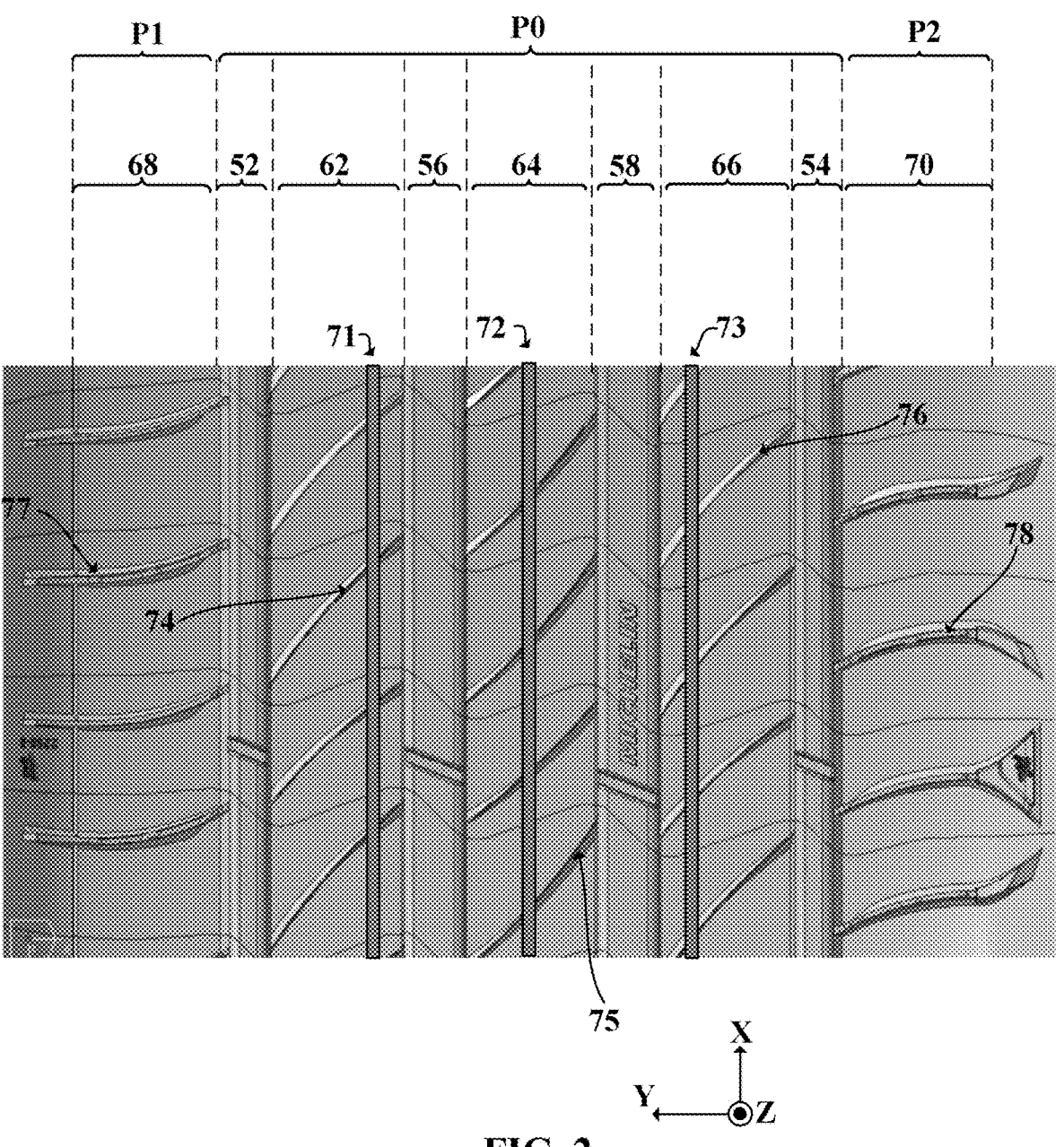
FIG. 2 is a top view of the tread of the tyre of FIG. 1.

With reference to FIGS. 1 and 2, the tread 14 comprises a tread surface 38 by means of which the tread 14 comes into contact with the ground. The tread surface 38 is intended to come into contact with the ground when the tyre 10 is running on the ground. The tread is axially delimited by first and second axial edges 41, 42 passing through each point N arranged on each side of the median plane M and for which the angle between the tangent T to the tread surface 38 and a straight line R parallel to the axial direction Y passing through this point is equal to 30°.

The tread 14 comprises an axially central portion P0 and first and second axially lateral portions P1, P2 arranged axially on the outside of the axially central portion P0 axially one on each side of the axially central portion P0 in relation to the median plane M of the tyre 10.

Without it being specific to the embodiment illustrated, the axially central portion P0 has an axial width L0 greater than or equal to 50%, preferably greater than or equal to 60%, and less than or equal to 80%, preferably less than or equal to 70% of the axial width L of the tread surface 38 of the tyre 10 when new. Each first and second axially lateral portion P1, P2 has an axial width L1, L2 less than or equal to 25%, preferably less than or equal to 20%, and greater than or equal to 5%, preferably greater than or equal to 10% of the axial width L of the tread surface 38 of the tyre 10 when new. The ratio of the axial width L0 of the central portion P0 to the axial width L1, L2 of each first and second axially lateral portion P1, P2 is greater than or equal to 3.0, preferably ranges from 3.0 to 5.0 and more preferably ranges from 4.0 to 4.5.

The axially central portion P0 comprises N>1 main circumferential cuts, in this case N main circumferential grooves, comprising first, second, third and fourth main circumferential cuts denoted by the references 52, 54, 56, 58, respectively. The first and second main circumferential cuts 52, 54 are arranged axially one on each side of the median plane M of the tyre 10 and are the axially outermost main circumferential cuts of the tread 14.

Each main circumferential cut 52 to 58 is axially delimited by an axially outer end denoted by the reference 521, 541, 561, 581, respectively, and by an axially inner end denoted by the reference 522, 542, 562, 582, respectively. The axially central portion P0 extends axially from the axially outer end 521 of the first main circumferential cut 52 as far as the axially outer end 541 of the second main circumferential cut 54.

Each main circumferential cut 52 to 58 has a depth that is denoted by the reference Ha1, Ha2, Ha3, Ha4, respectively, and ranges from 4.0 mm to the tread pattern height Hs, preferably ranging from 5.0 mm to the tread pattern height Hs and more preferably ranging from 5.5 mm to the tread pattern height Hs. Each depth Ha1, Ha2, Ha3, Ha4 is greater than or equal to 50% of the tread pattern height Hs. In this case, Hs=Ha3=Ha4-6.5 mm and Ha1=Ha2=6.0 mm. Thus, each main circumferential cut 52, 54, 56, 58 is such that Hai/Hs≥75% and in this case such that Hai/Hs≥90%, with i ranging from 1 to 4, since Hs=6.5 mm.

Each main circumferential cut 52 to 58 has an axial width that is denoted by the reference La1, La2, La3, La4, respectively, and is greater than or equal to 1.0 mm, preferably greater than or equal to 5.0 mm and more preferably greater than or equal to 8.0 mm and, more preferably still, ranging from 8.0 mm to 20.0 mm. In this case, La1=La2=10.0 mm and La3=La4=12.5 mm.

The axially central portion P0 comprises Q=N−1≥1 central ribs, in this case first, second and third central ribs, denoted by the references 62, 64, 66, respectively. Each central rib 62, 64, 66 is arranged axially between two of the adjacent main circumferential cuts 52 to 58 and is axially delimited by two adjacent main circumferential cuts 52 to 58.

Each central rib 62, 64, 66 is axially delimited by an axially inner end and by an axially outer end, each axially inner and outer end being an axially inner or outer end of the main circumferential cuts 52 to 58. The axially inner and outer ends of each central rib 62, 64, 66 are adjacent to one another. In this specific case, the first central rib 62 is axially delimited by the axially inner end 522 of the first main circumferential cut 52 and by the axially outer end 561 of the third main circumferential cut 56. The second central rib 64 is axially delimited by the axially inner end 562 of the third main circumferential cut 56 and by the axially inner end 582 of the fourth main circumferential cut 58. The third central rib 66 is axially delimited by the axially outer end 581 of the fourth main circumferential cut 58 and by the axially inner end 542 of the second main circumferential cut 54.

The axially central portion P0 comprises additional circumferential cuts formed in the central ribs 62, 64, 66. In this case, each central rib 62, 64, 66 comprises an additional circumferential cut 71, 72, 73, respectively. Each additional circumferential cut 71, 72, 73 has a depth strictly less than 50% of the tread pattern height Hs, preferably less than or equal to 30% of the tread pattern height Hs and more preferably ranging from 10% to 30% of the tread pattern height Hs and in this case ranging from 1.0 mm to 4.0 mm, and in this case equal to 2.0 mm. Each additional circumferential cut 71, 72, 73 has a respective axial width ranging from 4% to 15%, preferably from 4% to 10% respectively of each axial width of each central rib 62, 64, 66 and in this case less than or equal to 3.0 mm, preferably ranging from 1.0 mm to 3.0 mm and in this case equal to 1.0 mm.

Moreover, each central rib 62, 64, 66 comprises transverse cuts 74, 75, 76 satisfying for at least 50%, preferably for at least 75% and more preferably for 100% of the number of transverse cuts 74, 75, 76 of each central rib 62, 64, 66, at least one of the following conditions:

the transverse cut of the central rib has a width strictly less than 1.6 mm, preferably strictly less than 1.0 mm and more preferably strictly less than 0.7 mm, the transverse cut of the central rib has a depth H such that H/Hs<50%, preferably H/Hs≤30%.

In this specific case, each central rib 62, 64, 66 comprises transverse cuts 74, 75, 76 satisfying, for 100% of the number of transverse cuts 74, 75, 76 of each central rib 62, 64, 66, the condition according to which each transverse cut 74, 75, 76 has a width strictly less than 0.7 mm. In this regard, each central rib 62, 64, 66 is referred to as slightly cut.

The first axially lateral portion P1 extends axially from the first axial end 41 of the tread 14 as far as the axially outer end 521 of the first main circumferential cut 52. The second axially lateral portion P2 extends axially from the second axial end 42 of the tread 14 as far as the axially outer end 541 of the second main circumferential cut 54.

Each first and second axially lateral portion P1, P2 respectively comprises a first and a second lateral rib denoted by the references 68, 70, respectively, and in this instance is respectively made up of each first and second lateral rib 68, 70. The tyre 10 thus comprises P=2>1 lateral ribs. Thus, the first lateral rib 68 is axially delimited by two mutually adjacent ends, in this instance by the axial end 41 of the tread 14 and the axially outer end 521 of the first main circumferential cut 52. The second lateral rib 70 is axially delimited by two mutually adjacent ends, in this instance by the axial end 42 of the tread 14 and the axially outer end 541 of the second main circumferential cut 54. Each first and second lateral rib 68, 70 has an axial width denoted by the reference Lc1, Lc2, respectively, with Lc1=Lc2=33 mm holding true here.

Each first and second lateral rib 68, 70 comprises transverse cuts 77, 78 having a depth Ht such that Ht/Hs≥50%, preferably Ht/Hs≥75% and preferably Ht/Hs≥90%. Each transverse cut 77, 78 has a depth Ht ranging from 2.0 mm to the tread pattern height Hs, preferably ranging from 4.0 mm to the tread pattern height Hs and, more preferably still, ranging from 5.0 mm to the tread pattern height Hs, and in this case Ht=6.0 mm. Each transverse cut 77, 78 has a width greater than or equal to 0.7 mm, preferably greater than or equal to 1.0 mm and more preferably greater than or equal to 1.6 mm. In this regard, each lateral rib 68, 70 is referred to as deeply cut.

With reference to FIG. 1, the tyre 10 also comprises a layer 80 of a self-sealing product extending circumferentially radially on the inside of part of the airtight internal layer 18 and at least partially in line with the tread 14. The self-sealing product is known from the prior art and can be chosen notably from among the products described in documents WO2020009849, WO2011092122 and WO2011092123. The layer of self-sealing product is axially delimited by two axial ends 81, 82 arranged respectively at an axial distance less than or equal to 20%, preferably less than or equal to 10% of the axial width of the tread in relation to each axial end 41, 42, respectively, of the tread 14. In this instance, each axial end 81, 82 is radially aligned with each end 41, 42, respectively, even though preference will be given to the embodiments in which each axial end 81, 82 is arranged axially on the inside of each axial end 81, 82.

The layer of self-sealing product 80 comprises L≥1, in this instance L=4>1 axial portions referred to as thick axial portions and in this case denoted by the references 90, 92, 94, 96, and also M≥1, in this instance M=3>1 axial portions referred to as thin axial portions and in this case denoted by the references 100, 102, 104. As illustrated in FIG. 1, each thick and thin axial portion is delimited by two inflection points 81, 82, 83, 84, 85, 86, 87, 88 on the radially inner surface curve 89 of the layer of self-sealing product 80. Each thick axial portion 90 to 96 is axially delimited by two adjacent inflection points such that the thickness of each thick axial portion 90 to 96 increases in the direction axially towards the inside of each thick axial portion from each of the said inflection points. Each thin axial portion 100 to 104 is axially delimited by two adjacent inflection points such that the thickness of the said thin axial portion decreases in the direction axially towards the inside of each thin axial portion 100 to 104 from each of the said inflection points.

Each thick axial portion 90 to 96 and thin axial portion 100 to 104 extends circumferentially continuously over at least 50%, preferably at least 75% and more preferably over at least 95% and in the present case over 100% of the circumferential length of the layer of self-sealing product 80. The average thickness EE1, EE2, EE3, EE4 of each thick axial portion 90, 92, 94, 96, respectively, and the average thickness EM1, EM2, EM3 of each thin axial portion 100, 102, 104, respectively, is circumferentially substantially constant over at least 50%, preferably over at least 75% and more preferably over at least 95% and in the present case over 100% of the circumferential length of the layer of self-sealing product 80. In this instance, EE1=EE2=EE3=EE4=3.45 mm and EM1=EM2=EM3=1.95 mm.

Each thick axial portion 90, 92, 94, 96 comprises an axial portion 90', 92', 94', 96', respectively, extending axially in line with each main circumferential cut 52, 54, 56, 58, respectively. The layer of self-sealing product 80 thus comprises N=4 axial portions 90' to 96' extending axially in line with one of the N main circumferential cuts 52 to 58. Each axial portion 90' to 96' has an average thickness Eai>0 of self-sealing product, with i ranging from 1 to 4. In this instance, Ea1=Ea2=Ea3=Ea4=3.50 mm.

Each thick axial portion 90, 92 also comprises an axial portion 90", 92", respectively, extending axially in line with the first and the second lateral rib 68, 70. Each portion 90", 92" has an average thickness Ec1>0, Ec2>0, respectively. In this instance, Ec1=Ec2=3.50 mm.

Each thin axial portion 100, 102, 104 comprises an axial portion 100', 102', 104', respectively, extending axially in line with each central rib 62, 64, 66, respectively. The layer of self-sealing product 80 thus comprises Q=N−1=3 axial portions 100', 102', 104' extending axially in line with one of the Q central ribs 62, 64, 66. Each axial portion 100', 102', 104' is arranged axially between two adjacent axial portions 90' to 96'. Each axial portion 100', 102', 104' has an average thickness Ebj≥0 of self-sealing product, with j ranging from 1 to 3. In this instance, Eb1=Eb2=Eb3=2.00 mm.

It should be noted that, for each value of i ranging from 1 to N, at least 50% of the values of j ranging from 1 to Q, preferably at least 75% of the values of j ranging from 1 to Q and in this case 100% of the values of j ranging from 1 to Q are such that Ebj<Eai, Ebj<Ec1 and Ebj<Ec2.

It should also be noted that, for each value of i ranging from 1 to N, at least 50% of the values of j ranging from 1 to Q, preferably at least 75% of the values of j ranging from 1 to Q and in this case for 100% of the values of j ranging from 1 to Q are such that, on the one hand, Eai≥1.10×Ebj, preferably Eai≥1.30×Ebj and more preferably Eai≥1.50×Ebj and, on the other hand, Eai≤5.00×Ebj, preferably Eai≤4.00×

Ebj and more preferably Eai≤2.50×Ebj. In this case, for each value of i ranging from 1 to N, 100% of the values of j ranging from 1 to Q are such that Eai/Ebj=1.75.

It should also be noted that at least 50% of the values of j ranging from 1 to Q, preferably at least 75% of the values of j ranging from 1 to Q and in this case for 100% of the values of j ranging from 1 to Q are such that, on the one hand, Ec1≥1.10×Ebj and Ec2≥1.10×Ebj, preferably Ec1≥1.30×Ebj and Ec2≥1.30×Ebj and more preferably Ec1≥1.50×Ebj and Ec2≥1.50×Ebj and, on the other hand, Ec1≤5.00×Ebj and Ec2≤5.00×Ebj, preferably Ec1≤4.00×Ebj and Ec2≤4.00×Ebj and more preferably Ec1≤2.50×Ebj and Ec2≤2.50×Ebj. In this case, 100% of the values of j ranging from 1 to Q are such that Ec1/Ebj=1.75 and Ec2/Ebj=1.75.

Each thick axial portion 90, 92, 94, 96 at least partially coincides with all or part of each axial portion 90', 92', 94', 96', respectively. In this instance, as can be seen in FIG. 1, each thick axial portion 90, 92, 94, 96 has an axial width greater than or equal to the axial width of each main circumferential cut 52, 54, 56, 58, respectively. Thus, each thick axial portion 94, 96 has an axial width W3, W4, respectively, such that, on the one hand, W3/La3≤4.00 and W4/La4≤4.00, preferably W3/La3≤3.00 and W4/La4≤3.00, more preferably W3/La3≤2.00 and W4/La4≤2.00, more preferably still W3/La3≤1.50 and W4/La4≤1.50 and very preferably W3/La3≤1.25 and W4/La4≤1.25. In this instance, W3=W4=13.5 mm, such that W3/La3=W4/La4=1.08.

Moreover, each thick axial portion 90, 92 at least partially coincides with all or part of each axial portion 90", 92". In this instance, as can be seen in FIG. 1, each thick axial portion 90, 92 has an axial width greater than or equal to the axial width of each main circumferential cut 90", 92", respectively. Thus, each thick axial portion 90, 92 has an axial width W1, W2, respectively, such that, on the one hand, W1/Lc1≥0.50 and W2/Lc2≥0.50, preferably W1/Lc1>1.00 and W2/Lc2>1.00. In this instance, W1=W2=44 mm, such that W1/Lc1=W2/Lc2=1.33.

Moreover, it holds true that W1/La1≥0.50 and W2/La2≥0.50, preferably W1/La1>1.00 and W2/La2>1.00 and in this case W1/La1=W2/La2=4.40.

All of the conditions satisfied by the various axial portions 90 to 96, 90' to 96', 90", 92", 100 to 104 and 100' to 104' are satisfied over at least 50%, preferably over at least 75% and more preferably over at least 95% and in the present case over 100% of the circumferential length of the layer of self-sealing product 80.

Each axial portion 90' to 96', 90", 92" and 100' to 104' of the layer of self-sealing product extending in line with each cut 52 to 58 and with each rib 62 to 70 extends circumferentially continuously over at least 50%, preferably over at least 75% and more preferably over at least 95% and in the present case over 100% of the circumferential length of the layer of self-sealing product 80.

The average thickness Ea1 to Ea4, Ec1, Ec2 and Eb1 to Eb3 of each axial portion 90' to 96', 90", 92" and 100' to 104' is circumferentially substantially constant over at least 50%, preferably over at least 75% and more preferably over at least 95% and in the present case over 100% of the circumferential length of the layer of self-sealing product 80.

Figure 3:
FIG. 3 is a view, in a meridian section plane parallel to the axis of rotation of the tyre, illustrating the method for manufacturing the tyre of FIG. 1.

A method for manufacturing the tyre 10 will now be described with reference to FIG. 3.

A new tyre in its vulcanized state without a layer of self-sealing product 80 is provided.

An extrusion device and a device for applying a strip 200 of self-sealing product having a width equal to 15 mm and a thickness equal to 0.9 mm are provided. Such devices are described notably in WO2015/173120. In a variant, it is possible to use a bead of self-sealing product.

The strip 200 of self-sealing product is wound through multiple circumferential turns, in this instance through 33 circumferential turns, radially on the inside of the airtight layer 18 of the tyre. This winding step is carried out according to a law for winding the strip 200 in circumferential turns, the result of which is illustrated in FIG. 3.

The winding of the strip 200 is started from the axial end 81 and the winding of the strip 200 is stopped when the axial end 82 is reached. The strip 200 is wound without interrupting the strip 200 between the two axial ends 81, 82.

During the winding step, the strip 200 is wound on itself through Nai>1 radially superposed circumferential turns over each thick axial portion 90, 92, 94, 96 of the layer of self-sealing product 80, with i ranging from 1 to 4. The strip 200 is wound on itself through Nbj>1 radially superposed circumferential turns over each thin axial portion 100, 102, 104 of the layer of self-sealing product 80, with j ranging from 1 to M. For any value of i ranging from 1 to L, at least 50% of the values of j ranging from 1 to M, preferably at least 75% of the values of j ranging from 1 to M and in this case 100% of the values of j ranging from 1 to M are such that Nbj<Nai. In this specific case, it holds true that Na1=Na2=5 for each thick axial portion 90 and 92, Na3=Na4=4 for each thick axial portion 94, 96, and Nb1=Nb2=Nb3=3 for each thin axial portion 100, 102, 104.

It should be noted that, for each value of i ranging from 1 to L, at least 50% of the values of j ranging from 1 to M, preferably at least 75% of the values of j ranging from 1 to M and in this case 100% of the values of j ranging from 1 to M are such that, on the one hand, Nai/Nbj≥1.20 and, on the other hand, Nai/Nbj≤3.00, preferably Nai/Nbj≤2.75 and more preferably Nai/Nbj≤2.50.

To perform this winding step, the winding law includes multiple parameters for axially varying the thickness of the layer of self-sealing product 80. These parameters include a winding pitch of the strip 200, a winding speed of the strip 200 in relation to a device for applying the strip 200, an axial movement speed of the tyre 10 in relation to a device for applying the strip 200 in the tyre 10, an extrusion rate of the strip 200 of a device for extruding the strip 200, a width of the strip 200 or else a thickness of the strip 200. It is possible to choose to vary just one of these parameters or else multiple parameters at the same time. Advantageously, in this case solely the winding pitch of the strip 200 has been varied in order to axially vary the thickness of the layer of self-sealing product 80 over at least 50%, preferably over at least 75%, more preferably over at least 95% and in this case over 100% of the circumferential length of the layer of self-sealing product 80 and to obtain the layer illustrated in FIG. 3.

Figure 4:
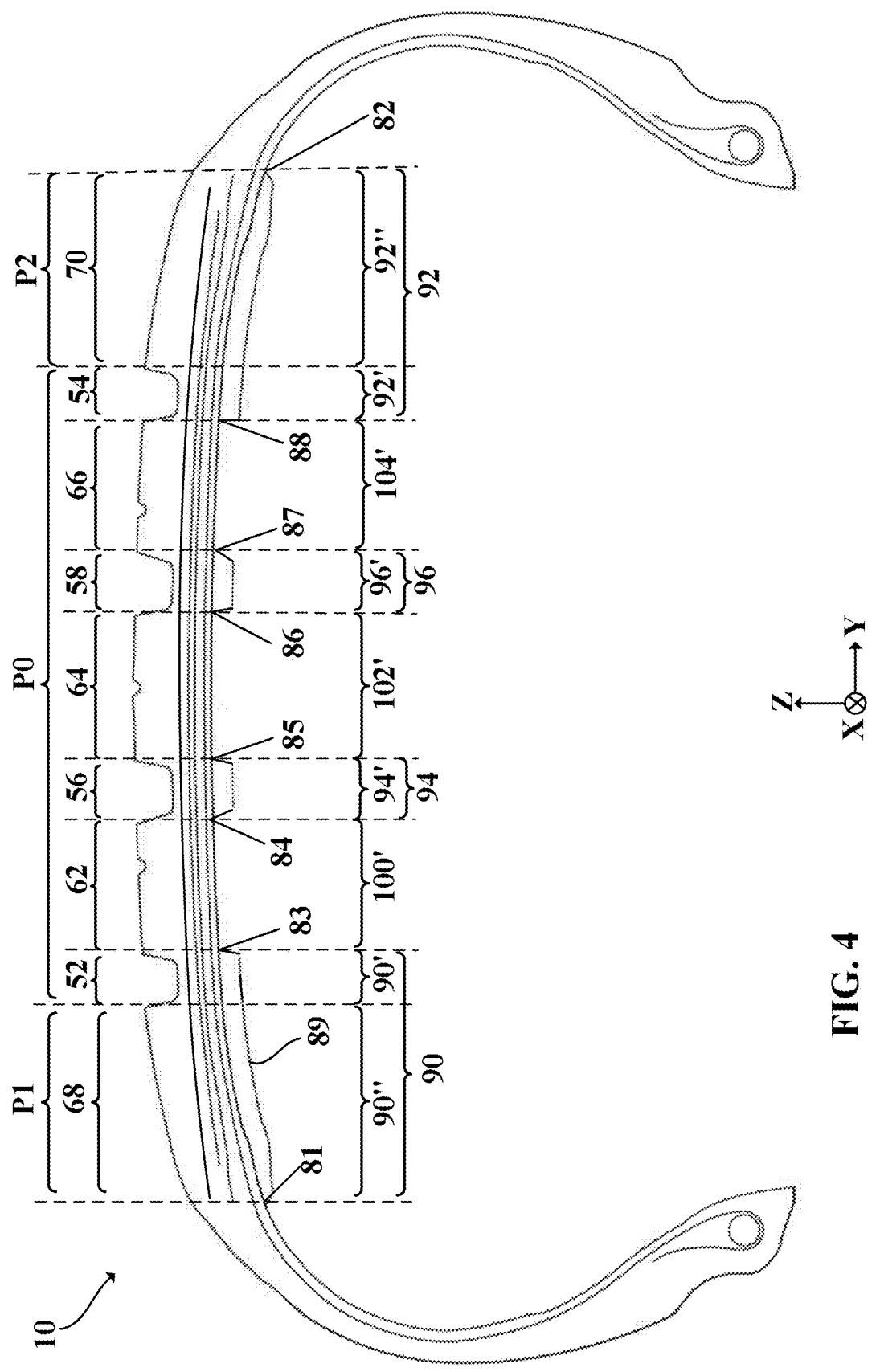
FIG. 4 is a view, similar to the one in FIG. 1, of a tyre according to a second embodiment of the invention.

A tyre according to a second embodiment of the invention will now be described with reference to FIG. 4. Elements similar to those of the first embodiment are denoted by identical references.

In comparison with the tyre according to the first embodiment, each thick axial portion 90 to 96 completely coincides with part of each axial portion 90' to 96', respectively, extending axially in line with each main circumferential cut 52 to 58, respectively.

Moreover, the layer of self-sealing product does not comprise any thin axial portion 100, 102, 104. Thus, each axial portion 100', 102', 104' extending axially in line with each central rib 62, 64, 66, respectively, has a self-sealing product thickness of zero. Each axial portion 100', 102', 104' is arranged axially between two of the axially adjacent axial portions 90' to 96' and also axially between the two axial portions 90'' and 92''.

During the method for manufacturing the tyre 10 according to the second embodiment, it is no longer the pitch at which the strip is laid but the thickness of the strip 200, which is substantially zero between the axially adjacent axial portions 90' to 96', that is varied. Thus, the strip 200 is wound with interruption of the strip 200, in this case three times, between the two axial ends 81, 82.

The invention is not limited to the embodiments described above.

Specifically, it is also possible to envisage an embodiment in which each central rib 62, 64, 66 lacks any transverse cut. In this case, it could be said that each central rib 62, 64, 66 is not cut.

The invention claimed is:

1. A tire comprising a tread comprising:

P deeply cut ribs comprising at least one transverse cut having a depth Ht such that Ht/Hs≥50%, where Hs is a tread pattern height and P is a total number of deeply cut ribs present on the tire, wherein a width of the transverse cuts of the P deeply cut ribs is greater than or equal to 1.0 mm;

Q=2 or Q=3 non-cut or slightly cut ribs, Q being a total number of non-cut or slightly cut ribs present on the tire, the non-cut or slightly cut ribs lacking transverse cuts or comprising transverse cuts, each non-cut or slightly cut rib satisfying, for at least 50% of a number of transverse cuts of the or each non-cut or slightly cut rib, the following conditions:

the transverse cuts of each non-cut or slightly cut rib have a width strictly less than 1.0 mm, and the transverse cuts of each non-cut or slightly cut rib have a depth H such that H/Hs<50%;

an airtight internal layer; and a layer of a self-sealing product extending circumferentially radially on an inside of part of the airtight internal layer, wherein, over at least 50% of a circumferential length of the layer of self-sealing product, the layer of self-sealing product comprises:

P>1 axial portions extending axially in line with one of the P deeply cut ribs and each having an average thickness Eck>0 of self-sealing product, one or more thick axial portions, at least partially coinciding with all or part of the P>1 axial portions, and Q=2 or Q=3 axial portions extending axially in line with one of the Q non-cut or slightly cut ribs and each having an average thickness Ebj≥0 of self-sealing product, with j ranging from 1 to Q, and being such that, for each value of k ranging from 1 to P, at least 50% of the values of j ranging from 1 to Q are such that Ebj<Eck, wherein each of the one or more thick axial portions is axially delimited by two adjacent inflection points on a radially inner surface curve of the layer of self-sealing product, each inflection point being (1) a point at which, in a meridian section plane, a direction of curvature of the radially inner surface curve of the layer of self-sealing product changes or (2) a termination point of the radially inner surface curve of the layer of self-sealing product in contact with the airtight internal layer, and wherein a thickness of each of the one or more thick axial portions increases in a direction axially toward an inside of the each of the one or more thick axial portions from each of the adjacent inflection points.

2. The tire according to claim 1, wherein each deeply cut rib and each non-cut or slightly cut rib is axially delimited by an axially inner end and by an axially outer end, each axially inner and outer end being chosen from:

an axial end of the tread, and an axially inner or outer end of a main circumferential cut having a depth Ha such that Ha/Hs≥50%, the axially inner and outer ends of each deeply cut rib or each non-cut or slightly cut rib being ends that are adjacent to one another.

3. The tire according to claim 1, wherein Ec≥1.10×Eb.

4. The tire according to claim 1, wherein Ec≤5.00×Eb.

5. The tire according to claim 1, wherein an axial width Wy of the each of the one or more thick axial portions is such that Wy/Lcy≥0.50, where Lcy is an axial width of each deeply cut rib.

6. The tire according to claim 1, wherein the or each transverse cut of each deeply cut rib has a depth ranging from 2.0 mm to the tread pattern height.

7. The tire according to claim 1, wherein each axial end of the layer of self-sealing product is arranged at an axial distance less than or equal to 20% of the tread in relation to each axial end, respectively, of the tread.

8. The tire according to claim 1, wherein the tread comprises:

an axially central portion comprising:

two axially outermost main circumferential cuts arranged axially one on each side of a median plane of the tire and having a depth Ha1, Ha2, respectively, such that Ha1/Hs≥50% and Ha2/Hs≥50%, and each non-cut or slightly cut rib, and wherein first and second axially lateral portions arranged axially on an outside of an axially central portion axially one on each side of the axially central portion in relation to a median plane of the tire, each first and second axially lateral portion extending axially from each axial end of the tread to each axially outer end of each axially outermost main circumferential cut, at least one of the first and second axially lateral portions comprising a deeply cut rib.

9. The tire according to claim 8, wherein each first and second axially lateral portion comprises a first and a second deeply cut rib, respectively.

10. The tire according to claim 1, wherein the Q=2 or 3 axial portions are arranged axially between two adjacent axial portions of the layer of self-sealing product extending axially in line with two of the P deeply cut ribs.

11. The tire according to claim 10, wherein the tread comprises N=Q+1>1 main circumferential cuts respectively having a depth Hai such that Hai/Hs≥50% for i ranging from 1 to N, N being a total number of main circumferential cuts present on the tire, each non-cut or slightly cut rib being arranged axially between two adjacent main circumferential cuts and being delimited axially by the two adjacent main circumferential cuts, wherein the layer of self-sealing product comprises N>1 axial portions each extending axially in line with one of the N main circumferential cuts and each having an average thickness Eai>0 of self-sealing product, such that, for each value of i ranging from 1 to N, at least 50% of the values of j ranging from 1 to Q are such that Ebj<Eai.

12. The tire according to claim 11, wherein each main circumferential cut has an axial width greater than or equal to 1.0 mm.

13. The tire according to claim 11, wherein each main circumferential cut has a depth ranging from 4.0 mm to the tread pattern height.

14. The tire according to claim 11, wherein an axial width Wx of each of the one or more thick axial portions is such that Wx/Lcx≥0.50, where Lcx is an axial width of a main circumferential cut.

\* \* \* \* \*